D. FITZPATRICK.
HOB FOR WORM GEARS.
APPLICATION FILED NOV. 2, 1917. RENEWED FEB. 11, 1922.

1,436,159.

Patented Nov. 21, 1922.

Inventor
David Fitzpatrick
By his Attorneys

Patented Nov. 21, 1922.

1,436,159

UNITED STATES PATENT OFFICE.

DAVID FITZPATRICK, OF CLEVELAND, OHIO, ASSIGNOR TO THE CLEVELAND WORM AND GEAR COMPANY, OF CLEVELAND, OHIO, A CORPORATION OF OHIO.

HOB FOR WORM GEARS.

Application filed November 2, 1917, Serial No. 199,833. Renewed February 11, 1922. Serial No. 535,966.

*To all whom it may concern:*

Be it known that I, DAVID FITZPATRICK, a subject of the King of Great Britain, and resident of Cleveland, county of Cuyahoga, and State of Ohio, have invented certain new and useful Improvements in Hobs for Worm Gears, of which the following is a specification.

My invention relates to a cutting tool commonly known as a hob that is used in cutting the teeth in worm gear wheels. Such gear wheels are either made entirely of bronze or are made with an iron center and a bronze rim in which the teeth are cut. In order to obtain high efficiency, these teeth must be cut with extreme accuracy. Consequently, the cutting operation has been comparatively slow heretofore because a very slight error was sufficient to spoil the gear and cause a total loss.

The main object of my invention is to provide a cutting hob which can be operated at a relatively high speed which will give the desired accuracy in the finished tooth.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings—

Figure 1:
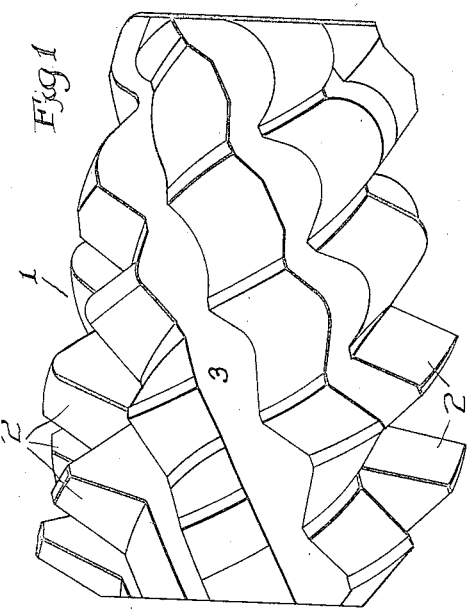
Figure 1 is a side view of my improved cutting hob.
Figure 3:
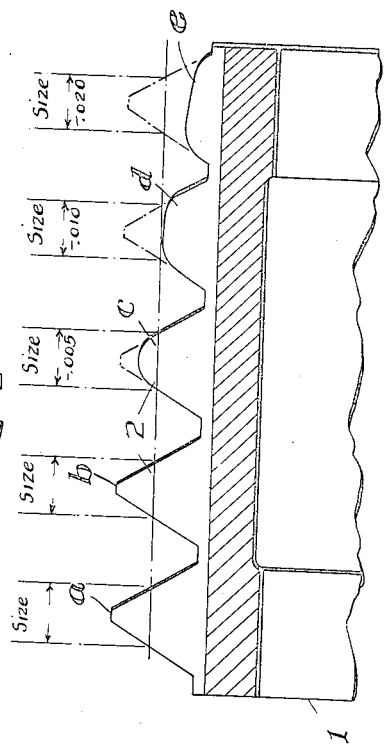
Figure 3 is a section through one of the cutting teeth.
Figure 2:
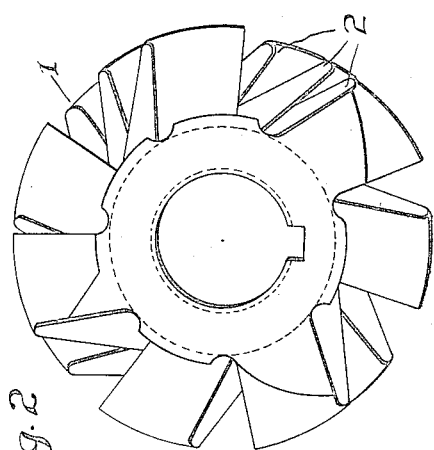
Figure 2 is an end view of the same.
Figure 4:
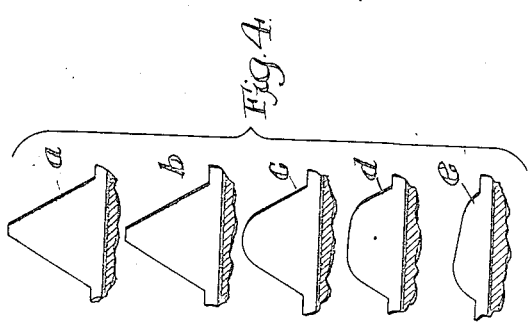
Figure 4 is a diametric view showing the construction of a row of teeth.

The hob 1 is made of steel and the teeth 2 are formed by cutting longitudinal and transverse grooves 3. The teeth at the forward end are cut down and the depth of the teeth is gradually increased toward the rear so as to make a gradually deepening cut in the worm gear and the teeth are backed off to give the necessary clearance.

After the teeth have been cut to shape as just described, then the width of the forward teeth is carefully cut in the following manner. The rear teeth are carefully cut to a scale starting at normal width in the case of one or more of the rear teeth and gradually decreasing toward the front of the hob. As shown in the accompanying drawing, the two rear teeth $a$ and $b$ are of normal width; that is, the exact width of the space in the finished worm gear. The tooth $c$ just in front of the rearward and normal hob teeth, is cut down .005 of an inch. The next forward tooth $d$ is cut down .010 of an inch and the next forward tooth $e$ is cut down .020 of an inch. The exact amount of reduction between members in the series is not important, it being essential only that the teeth be narrowed an increasing amount toward the front of the hob. Consequently as each succeeding tooth on the hob is brought into cutting contact with the gear blank, it widens the cut in the blank as well as deepens it and until the finishing tooth on the hob finally engages the blank, the cut has not reached full dimensions either with respect to depth or to width. Therefore, any roughness or scoring or any inequalities from any cause that have been made in the gear blank are rectified by the finishing teeth of the hob.

By this construction the work can be driven through the series of teeth at a much faster rate of speed than would be practiced if constant care and supervision were required to prevent an absolute loss which would result if the first set of teeth should be of a full width and any defect in cutting the blank should occur.

Very slight errors in the adjustment of the machine may also be corrected if discovered before the final or finishing cut is made. The cost of making the hob is not materially increased so that the saving which results from the greater speed of the work and increased production is a direct advantage.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention as defined in the appended claim.

Having thus described my invention, I claim:

1. A cutting tool for worm gears having a substantially frusto-conical form and provided with longitudinal and transverse grooves forming teeth, one of the teeth adjacent the large end of the tool being a finishing tooth adapted to shape the worm-gear-groove to size, the teeth in advance of the finishing tooth being of progressively less depth towards the small end of the tool whereby each succeeding tooth from the small end is adapted to bite into the worm-gear-blank a distance greater than the distance advanced by the preceding tooth, the base parts of the forward and rear sides of the teeth in advance of the finishing tooth being each parallel to the corresponding sides of the finishing tooth, and each tooth being of progressively greater width from the small end of the tool towards the large end.

2. A tool for cutting worm gears having a frustoconical form and provided with intersecting grooves forming teeth, said teeth having progressively increasing width and depth from the smaller to the larger end of the tool so as to cut the gear by progressively increasing amounts, the final teeth being formed to shape the worm gear groove to size.

Signed at Cleveland, in the county of Cuyahoga, and State of Ohio, this 25th day of October, 1917.

DAVID FITZPATRICK.